United States Patent
Krogdahl

(10) Patent No.: US 9,815,259 B2
(45) Date of Patent: Nov. 14, 2017

(54) REWORKABLE ADHESIVE TAPE FOR JOINING DEVICE STRUCTURES

(71) Applicant: Apple Inc., Cupertino, CA (US)

(72) Inventor: James R. Krogdahl, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 14/334,416

(22) Filed: Jul. 17, 2014

(65) Prior Publication Data

US 2015/0138746 A1 May 21, 2015

Related U.S. Application Data

(60) Provisional application No. 61/905,485, filed on Nov. 18, 2013.

(51) Int. Cl.
*B32B 7/12* (2006.01)
*B32B 27/08* (2006.01)
*C09J 7/02* (2006.01)

(52) U.S. Cl.
CPC ........... *B32B 27/08* (2013.01); *B32B 7/12* (2013.01); *C09J 7/0296* (2013.01); *B32B 2250/02* (2013.01); *B32B 2250/24* (2013.01); *B32B 2250/40* (2013.01); *B32B 2255/10* (2013.01); *B32B 2255/26* (2013.01); *B32B 2405/00* (2013.01); *C09J 2201/128* (2013.01); *C09J 2201/162* (2013.01); *C09J 2201/606* (2013.01); *C09J 2400/226* (2013.01); *Y10T 428/24942* (2015.01); *Y10T 428/2848* (2015.01)

(58) Field of Classification Search
None
See application file for complete search history.

(56) References Cited

U.S. PATENT DOCUMENTS

| | | |
|---|---|---|
| 5,203,143 A | 4/1993 | Gutentag |
| 8,722,185 B2 | 5/2014 | Niwa et al. |
| 2009/0035563 A1 | 2/2009 | Husemann et al. |
| 2010/0209649 A1 | 8/2010 | Kuwahara et al. |
| 2011/0300361 A1 | 12/2011 | Nakayama et al. |
| 2012/0009399 A1 | 1/2012 | Nonaka et al. |
| 2013/0136874 A1 | 5/2013 | Xia et al. |
| 2014/0044915 A1* | 2/2014 | Niwa ............ C09J 7/0246 428/80 |
| 2014/0166829 A1* | 6/2014 | Thompson ........... A47K 5/02 248/201 |

* cited by examiner

*Primary Examiner* — Frank D Ducheneaux
(74) *Attorney, Agent, or Firm* — Treyz Law Group, P.C.; Michael H. Lyons; David K. Cole

(57) ABSTRACT

Double-sided reworkable pressure sensitive adhesive tape joins electronic device structures. The reworkable pressure sensitive adhesive tape has a pair of polymer carrier layers that are attached to each other using a thermoplastic adhesive. Opposing outer surfaces of the carrier layers are coated with pressure sensitive adhesive. The thermoplastic material that is used in attaching the carriers to each has a softening temperature that allows the thermoplastic material to be softened without significantly softening the carrier layers. When the thermoplastic material is softened, the structures that have been joined using the tape may be separated from each other. This divides the tape into two tape remnants. After cooling the tape remnants to restore cohesive strength to the pressure sensitive adhesive, the tape remnants can be cleanly peeled away from the structures. Additional reworkable tape may then be used to reattach the structures.

20 Claims, 12 Drawing Sheets

REWORKABLE ADHESIVE TAPE FOR JOINING DEVICE STRUCTURES

This application claims the benefit of provisional patent application No. 61/905,485, filed Nov. 18, 2013, which is hereby incorporated by reference herein in its entirety.

BACKGROUND

This relates generally to adhesive and, more particularly, to reworkable adhesive tape structures for joining structures such as electronic device structures.

Devices such as cellular telephones, computers, displays, and other electronic equipment contain structures that are joined using adhesive. Adhesive is often dispensed in the form of double-sided adhesive tape.

Faults are sometimes detected when manufacturing an electronic device. For example, a faulty component may be identified or an assembly operation may be performed imperfectly. In some situations, faults may be serious enough that a device must be scrapped. In other situations, it is possible to rework a device and thereby salvage unaffected components. During rework operations, a faulty component can be replaced with a defect-free component.

The ability to easily rework a device can often lead to substantial improvements in assembly efficiency. In contrast, a device design that is difficult to rework may result in the need to scrap an undesirably large number of devices.

To ensure that device structures are satisfactorily bonded together, adhesive tape is often used that can form strong adhesive bonds. To help disassemble parts that have been attached to each other using adhesive tape, the adhesive tape can be heated. This reduces the cohesive strength of the adhesive in the adhesive tape sufficiently that the parts can be pulled apart. Unfortunately, tape that is pulled apart in this way tends to leave stubborn adhesive residues on the surfaces of the disassembled parts. Before the parts can be reworked, solvents must be used to remove the adhesive residues. The use of solvents to clean the surface of the parts can be time consuming and messy.

It would therefore be desirable to be able to provide adhesive tape structures that facilitate rework operations during electronic device assembly.

SUMMARY

Reworkable pressure sensitive adhesive tape may be used to attach structures together. For example, a display cover layer may be attached to a device housing using reworkable adhesive tape or other electronic device structures may be bonded to each other using reworkable adhesive tape. The tape may be debonded by localized application of heat when it is desired to rework the device structures.

The reworkable pressure sensitive adhesive tape may have a pair of flexible polymer carrier layers that are attached to each other using a thermoplastic adhesive. Opposing outer surfaces of the carrier layers may be coated with pressure sensitive adhesive. The pressure sensitive adhesive may be used in attaching structures together such as electronic device structures.

The thermoplastic material that is used in joining the flexible polymer carrier layers to each other may have a softening temperature that allows the thermoplastic material to be softened without softening the carrier layers. For example, the thermoplastic material may have a softening temperature of 80-100° C., whereas the carrier layers may be formed from a flexible polymer that does not soften at temperatures below 100° C.

When bonding two structures together, the pressure sensitive adhesive on a first of the pair of carriers may be attached to a first of the structures and the pressure sensitive adhesive on a second of the pair of carriers may be attached to a second of the structures.

When the thermoplastic material is softened, the bonded structures can be separated from each other. During this process, the tape may be divided into two pieces, one of which remains attached to the first of the structures and the other of which remains attached to the second of the structures. The tape remnants can be removed from the first and second structures to facilitate rework. Cooling the tape remnants restores cohesive strength to the pressure sensitive adhesive on the tape remnants, allowing the tape remnants to be cleanly peeled away from the structures. Additional reworkable tape may then be used to reattach the structures.

DETAILED DESCRIPTION

Structures such as electronic device structures may be attached to each other using welds, solder, screws and other fasteners, and adhesive. Adhesive may be advantageous for forming compact and inexpensive bonds. For example, adhesive may be used in attaching electronic device structures to each other in situations in which device bulk is to be minimized and in which it is desired to avoid the cost and complexity of alternative fastening mechanisms.

It is often desirable to attach structures with adhesive tape. Adhesive tape includes a flexible layer, sometimes referred to as a carrier or substrate. Pressure sensitive adhesive can be used to coat a single carrier surface or double-sided tape can be formed by coating opposing carrier surfaces with pressure sensitive adhesive. In many applications, pressure sensitive adhesive tapes are preferred to other adhesives due to ease of application. For example, pressure sensitive adhesive tapes such as double-sided tapes can be used to attach electronic device structures together in situations in which liquid or sprayed adhesives might be difficult to control.

Component and assembly defects are sometimes detected during manufacturing, necessitating rework. For example, testing may reveal that two device structures are not aligned as accurately as desired. It may therefore be desirable to correct the misalignment. As another example, a manufacturer may desire to replace a component that has been incorporated within a partly or fully assembled device with a fresh component. Devices may sometimes be reworked in the field after being sold to an end user. For example, devices may be repaired by service personnel.

Rework operations such as these may involve debonding adhesive tape joints. Rework operations can be facilitated by incorporating a thermoplastic layer into the middle of an adhesive tape stack-up. When it is desired to rework an adhesive tape joint, heat may be applied to the joint. The heat softens the thermoplastic layer sufficiently to debond the joint, thereby permitting structures that were attached to each other by the adhesive tape to be separated from each other. Following cooling, remnants of the adhesive tape may be peeled off of the structures. Cooling of the adhesive tape to room temperature after debonding operations helps to restore the cohesive strength of the pressure sensitive adhesive, which allows the tape to be peeled off cleanly, without leaving behind patches of pressure sensitive adhesive. The use of solvents can therefore be reduced or even eliminated.

Illustrative electronic devices of the types that may be provided with structures that are joined using adhesive tape are shown in FIGS. 1, 2, 3, and 4.

Figure 1:
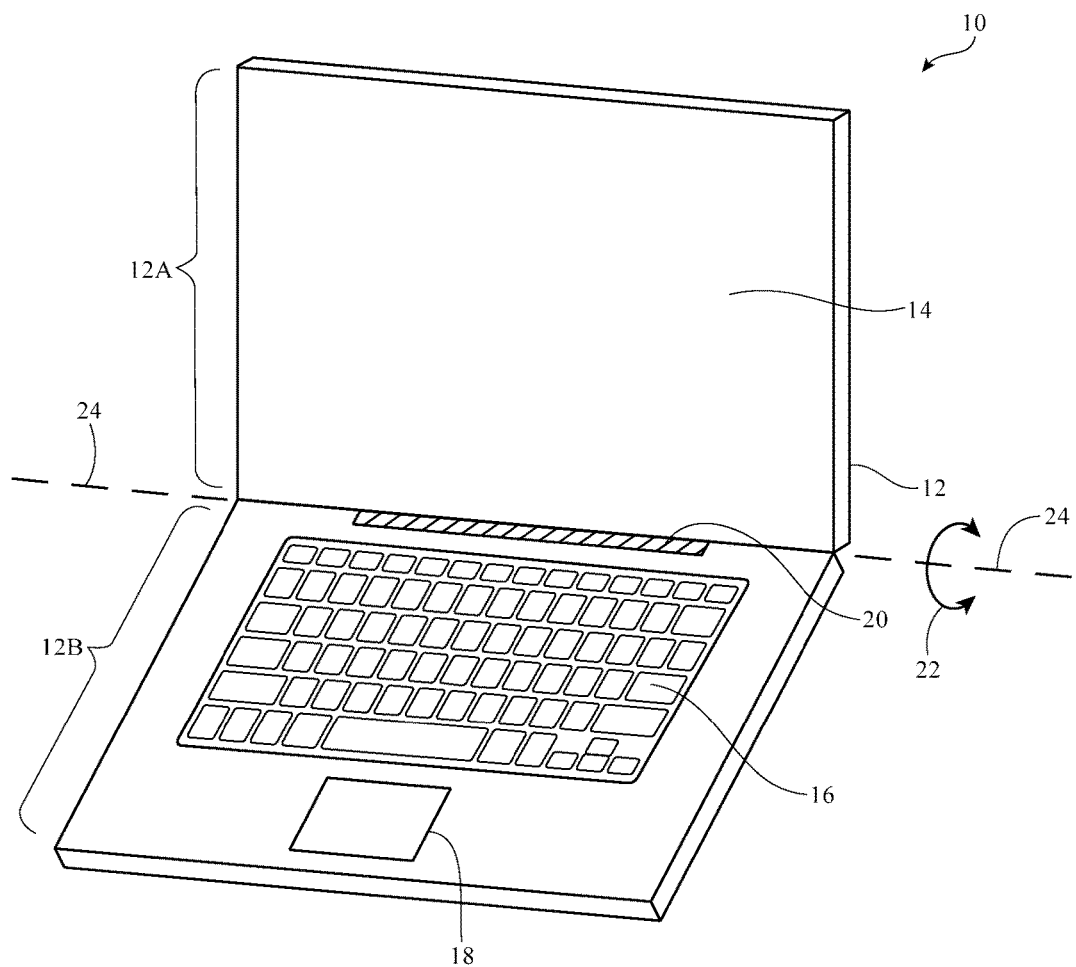
FIG. 1 is a perspective view of an illustrative electronic device such as a laptop computer with structures that are attached using adhesive tape in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
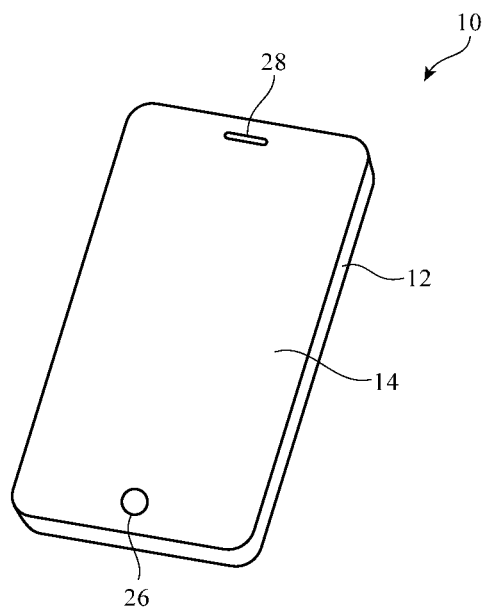
FIG. 2 is a perspective view of an illustrative electronic device such as a handheld electronic device with structures that are attached using adhesive tape in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
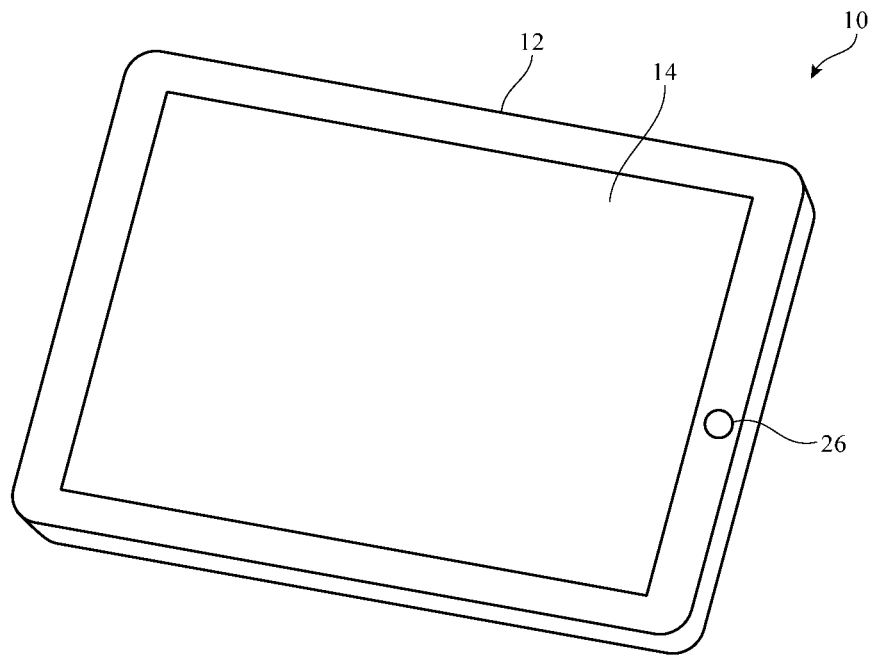
FIG. 3 is a perspective view of an illustrative electronic device such as a tablet computer with structures that are attached using adhesive tape in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
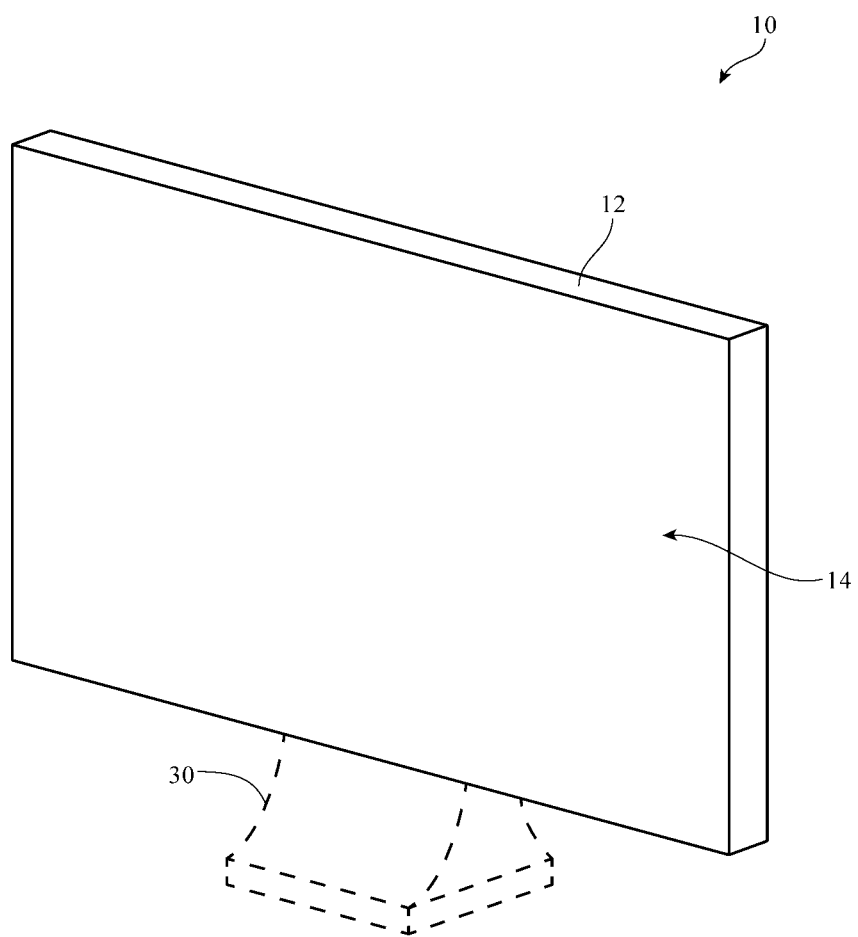
FIG. 4 is a perspective view of an illustrative electronic device such as a display for a computer or television with structures that are attached using adhesive tape in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table top or desk.

Display 14 may be a liquid crystal display, an organic light-emitting diode display, a plasma display, an electrophoretic display, an electrowetting display, a display using other types of display technology, or a display that includes display structures formed using more than one of these display technologies. If desired, a touch sensor may be incorporated into display 14.

Adhesives may be used in attaching together structures within equipment such as electronic devices 10 of FIGS. 1, 2, 3, and 4 and other electronic devices. Adhesives such as pressure sensitive adhesives may be dispensed using flexible carrier substrates. For example, reworkable pressure sensitive adhesive tape (sometimes referred to as pressure sensitive tape) may be used to couple together plastic structures, metal structures, glass structures, ceramic structures, display structures, housing structures, internal device structures, electrical components in the interior of an electronic device, other structures, or combinations of these structures. Examples of pressure sensitive adhesives include acrylic pressure sensitive adhesives and silicone pressure sensitive adhesives. Other types of pressure sensitive adhesive may be used in forming a reworkable pressure sensitive adhesive tape if desired.

Adhesive tape may be provided with flexible carriers such as one or more flexible polymer layers. Examples of polymers that may be used as tape carriers include polyester film (i.e., polyethylene terephthalate) and polyimide. Other polymer layers that may be used as pressure sensitive adhesive tape carriers may be used if desired. Tape may be dispensed in the form of elongated strips, in ring shapes (e.g., die cut circular or rectangular rings with open centers), L-shaped and C-shaped patterns, circles, squares, other solid shapes, or other suitable shapes.

If desired, non-stick release liners may be coupled to the exposed surfaces of pressure sensitive adhesive tapes. Release liners may facilitate tape handling during manufacturing. The release liner(s) on an adhesive tape structure may be removed just prior to use of the adhesive tape structure in attaching structures in an electronic device together.

Figure 5:
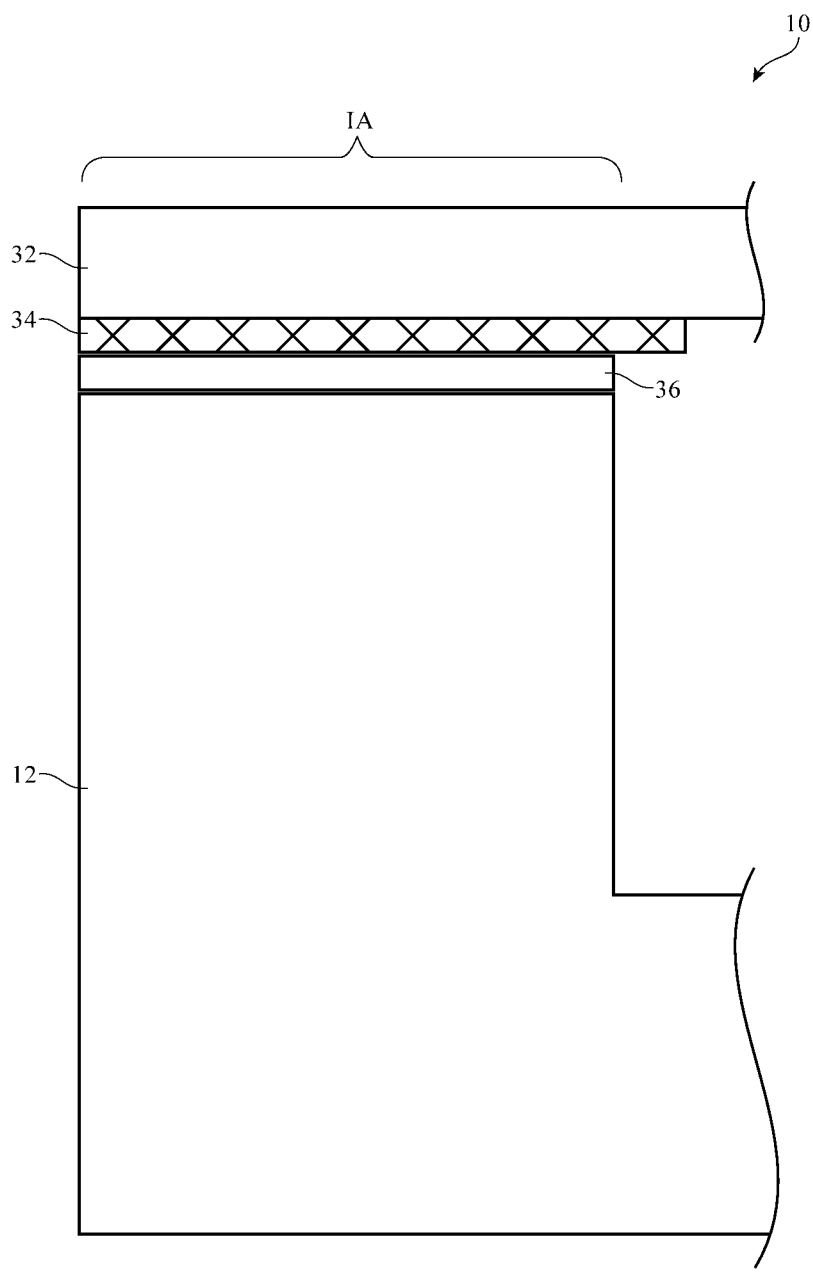
FIG. 5 is a cross-sectional side view of illustrative electronic device structures that are attached using adhesive tape in accordance with an embodiment.

FIG. 5 is a cross-sectional side view of a portion of an illustrative electronic device in which pressure sensitive adhesive tape is being used to attach device structures to each other. As shown in FIG. 5, device 10 may include display cover layer 32 and housing 12. Display cover layer 32 may be a layer of clear glass, a transparent plastic layer, or other display structure for display 14. Housing 12 may be a machined metal housing (e.g., an aluminum housing or stainless steel housing), a plastic housing (e.g., a molded plastic housing and/or a plastic housing with housing surfaces formed by machining, etc.), a ceramic housing, a glass housing, or other suitable housing for device 10. If desired, display cover layer 32 may be provided with an opaque masking layer such as opaque masking layer 34. Opaque masking layer 34 may be formed in peripheral inactive area IA of display 14. Opaque masking layer 34 may be, for example, a coating of ink such as black ink or white ink or other opaque material.

Reworkable (debondable) pressure sensitive adhesive tape 36 may be interposed between display cover layer 32 and housing 12 and may be used in attaching display cover layer 32 or other display structures to housing 12. Pressure sensitive adhesive tape 36 may include a thermoplastic layer that is heated when it is desired to debond tape 36 and thereby separate bonded structures from each other such as display cover layer 32 and housing 12.

Figure 6:
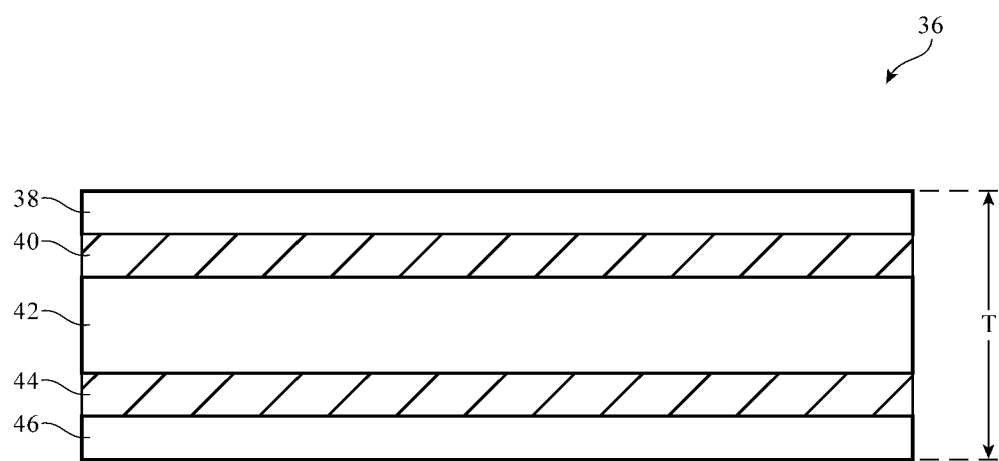
FIG. 6 is a cross-sectional side view of illustrative double-sided thermally debondable adhesive tape in accordance with an embodiment.

Reworkable pressure sensitive adhesive tape 36 may have multiple layers of material. FIG. 6 is a cross-sectional side view of an illustrative segment of pressure sensitive adhesive tape 36. As shown in FIG. 6, opposing first and second sides of tape 36 (i.e., the outer surfaces of tape 36) may be coated with pressure sensitive adhesive such as pressure sensitive adhesive layer 38 and opposing pressure sensitive adhesive layer 46, thereby forming a double-sided tape. Tape 36 may contain first and second carrier (substrate) layers formed from flexible materials such as flexible sheets of polymer. Tape 36 may, for example, have first flexible polymer carrier 40 and second flexible polymer carrier 44. Pressure sensitive adhesive layer 38 may be deposited as a coating on flexible polymer carrier 40. Pressure sensitive adhesive layer 46 may be deposited on flexible polymer carrier 44.

Flexible polymer carriers 40 and 44 may be attached to each other using a layer of thermoplastic adhesive such as thermoplastic layer 42. Thermoplastic adhesive layer 42 may be formed from a material such as polyurethane (i.e., thermoplastic polyurethane), polyester, ethylene-vinyl acetate, polyamide, polycarbonate, silicone, ethylene-acrylate, styrene block copolymers, etc.

The total thickness T of tape 36 may be 50-400 microns, 100-200 microns, 150-200 microns, more than 50 microns, less than 400 microns, less than 200 microns, more than 100 microns, or other suitable thickness. The thickness of pressure sensitive adhesive layer 38 may be about 10 microns (e.g., 2-50 microns). Pressure sensitive adhesive layer 46 may be about 10 microns (e.g., 2-50 microns). Flexible polymer carrier layers 40 and 44 may each be about 10-20 microns (e.g., 2-50 microns). Thermoplastic layer 42 may have a thickness of about 20 microns (e.g., 2-200 microns, 2-50 microns, or other suitable thickness).

The material that is used for thermoplastic layer 42 may be rigid or elastomeric. If desired, the thickness and elasticity of layer 42 may be selected so that tape 36 forms a cushion in the event of an unexpected impact event such as when device 10 is unexpectedly dropped onto a hard surface.

Thermoplastic layer 42 preferably has a softening temperature that allows tape 36 to be separated into two pieces by applying heat without over-heating surrounding device structures or other portions of tape 36. Thermoplastic layer 42 may, for example, have a softening temperature of 80-100° C., 50-120° C., less than 100° C., or less than 90° C. (as examples). When tape 36 is raised to a temperature that is sufficient to soften thermoplastic layer 42 and thereby allow tape 36 to be pulled apart, the remaining portions of tape 36 remain intact (e.g., carriers 40 and 44 will not soften significantly while thermoplastic layer 42 is being heated sufficiently to soften). If, for example, layer 42 has a softening temperature of 100° C., carriers 40 and 44 may be formed form a material that does not exhibit a softening temperature below 100° C.

Figure 8:
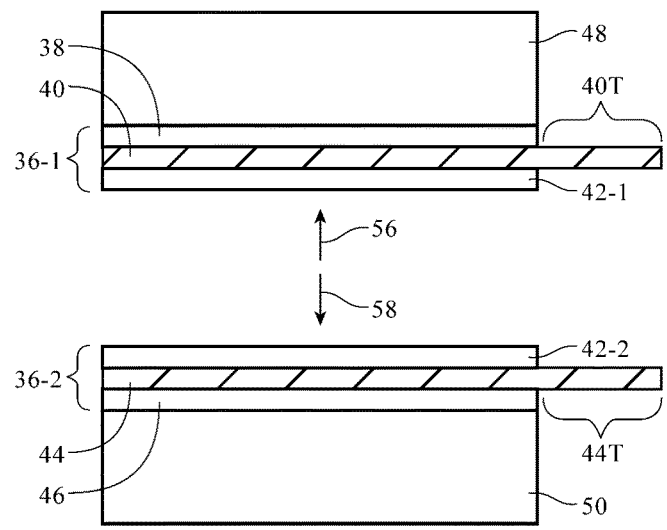
FIG. 8 is a cross-sectional side view of the illustrative structures of FIG. 7 after separating the structures from each other by performing thermal debonding operations on the reworkable adhesive tape in accordance with an embodiment.
Figure 9:
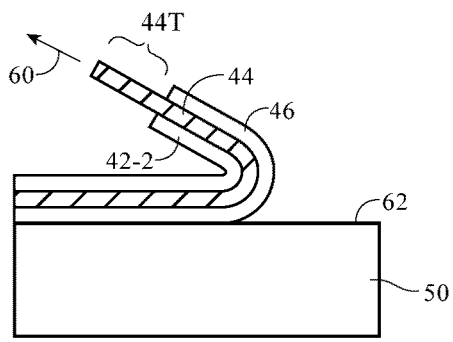
FIG. 9 is a cross-sectional side view of one of the illustrative structures of FIG. 8 in which an adhesive tape remnant that remained on the surface of the structure following thermal debonding operations is being peeled from the surface to facilitate rework in accordance with an embodiment.

With a configuration of the type shown in FIG. 6, tape 36 facilitates rework (e.g., rework such as repair during manufacturing or in the field that involves disassembling structures that have been bonded together using adhesive by debonding the adhesive). Illustrative operations involved in performing rework operations with tape 36 are shown in FIGS. 7, 8, and 9.

Figure 7:
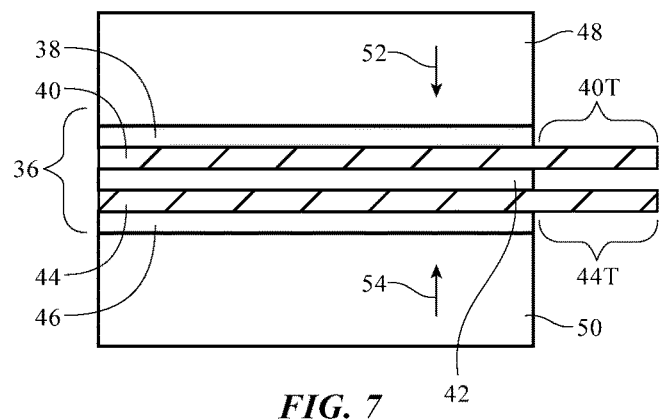
FIG. 7 is a cross-sectional side view of electronic device structures being attached to each other using reworkable adhesive tape such as the tape of FIG. 6 in accordance with an embodiment.

As shown in the example of FIG. 7, tape 36 may be used to attach together a pair of electronic device structures such as structures 48 and 50. Structures 48 and 50 may be structures such as a display cover glass, a housing formed from metal, glass, ceramic, plastic, carbon fiber or other fiber-based composite, or a combination of such housing materials, a metal member, a glass member, a plastic member, other structures in device 10 formed from materials such as metal, glass, ceramic, plastic, carbon fiber or other fiber-based composite, or a combination of such materials, electronic components, internal device structures, internal frame structures, housing midplate members, etc.

Initially, structures 48 and 50 may be attached together by pressing structures 48 and 50 towards each other in directions 52 and 54, respectively. Pressure sensitive adhesive tape 36 may be interposed between structures 48 and 50 so that pressure sensitive adhesive tape 36 is compressed between structures 48 and 50 when structures 48 and 50 are pressed towards each other. Structures 48 and 50 may be pressed together manually and/or using computer-controlled assembly equipment. Sufficient pressure may be used to press structures 48 and 50 together to form pressure sensitive adhesive bonds between pressure sensitive adhesive layer 38 and the adjacent surface of structure 48 and between pressure sensitive adhesive layer 46 and the adjacent surface of structure 50.

To facilitate removal of tape remnants from structures 48 and 50 following thermal debonding, carrier layers 40 and 44 may be provided with one or more protrusions such as tabs 40T and 44T. Tabs 40T and 44T may protrude out from between structures 48 and 50 and may be configured to be manually grasped and/or engaged using computer-controlled equipment during tape remnant removal operations.

When it is desired to rework the assembly of FIG. 7 (e.g., to permit repair or replacement of structures 48 and/or 50 and/or other structures within device 10 such as structures that would otherwise be obstructed due to the attachment of structures 48 and/or 50), heat may be applied to tape 36. The applied heat is used to raise the temperature of thermoplastic layer 42 above its softening temperature without raising the temperature of carrier layers 40 and 44 sufficiently to soften carrier layers 40 and 44 significantly (i.e., layers 40 and 44 do not exhibit a softening temperature equal to or below the softening temperature o thermoplastic layer 42). As shown in FIG. 8, once thermoplastic layer 42 has been sufficiently softened, structures 48 and 50 may be pulled apart in directions 56 and 58, respectively. This divides tape 36 into two portions such as first portion 36-1 and second portion 36-2. Portions 36-1 and 36-2 may sometimes be referred to as tape remnants.

As shown in FIG. 8, tape portion 36-1 includes pressure sensitive adhesive layer 38, flexible polymer carrier 40, and first portion 42-1 of thermoplastic layer 42. Tape portion 36-2 includes pressure sensitive adhesive layer 46, flexible polymer carrier layer 44, and second portion 42-2 of thermoplastic layer 42. Portions 42-1 and 42-2 may form divided thermoplastic layers on opposing surfaces of layers 40 and 44, respectively. Thermoplastic 42 may be sufficiently soft and liquid that thermoplastic 42 does not offer substantial resistance when pulling apart structures 48 and 50, thereby reducing the possibility of damage during disassembly. Debonding the joint formed by tape 36 in this way helps ensure that structures 48 and 50 will not be subjected to excessive forces when being separated from each other.

After structures 48 and 50 have been separated, tape remnants 36-1 and 36-2 may be cooled. For example, tape remnants 36-1 and 36-2 may be cooled to room temperature or a temperature below room temperature. To cool separated tape structures such as remnants 36-1 and 36-2 to a reduced temperature, remnants 36-1 and 36-2 may be placed in a cooled chamber, may be cooled with application of a gas or liquid, may be placed on a cooled plate, or may otherwise by lowered in temperature.

Lowering the temperature of tape remnants 36-1 and 36-2 after structures 48 and 50 have been separated restores the cohesive strength of pressure sensitive adhesive layers 38 and 46 (e.g., the cohesive strength of the pressure sensitive adhesive may be returned to its original level prior to thermal debonding operations). This helps the material of layers 38 and 46 hold together as tape remnants 36-1 and 36-2 are being removed from structures 48 and 50. Tape remnants 36-1 and 36-2 may be removed from structures 48 and 50 by peeling tape remnants 36-1 and 36-2 away from the surfaces of structures 48 and 50 using tabs 40T and 44T, respectively. During peeling operation, the cohesive strength of the pressure sensitive adhesive helps cleanly remove pressure sensitive adhesive material from the structures to which the pressure sensitive adhesive was attached, thereby helping to minimize or eliminate the need to use solvents to clean the surfaces from which the tape is being peeled. An illustrative example is shown in FIG. 9 in which tape remnant 36-2 is being peeled off of structure 50 by pulling tab 44T of flexible polymer carrier in direction 60 away from surface 62 of structure 50.

Once the surfaces of structures 48 and 50 have been cleaned of pressure sensitive adhesive and other materials associated with tape remnants 36-1 and 36-2 and after structures 48 and/or 50 and/or other structures in device 10 have been repaired (e.g., replaced with new structures, etc.), a new piece of reworkable pressure sensitive adhesive tape 36 may be used to attach structures 48 and 50 together.

Figure 10:
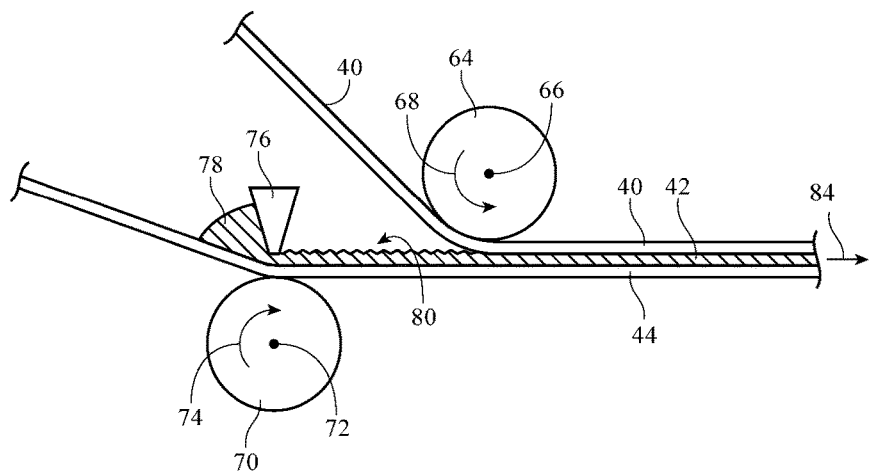
FIG. 10 is a diagram of illustrative equipment for dispensing thermoplastic between flexible polymer carrier layers for use in forming an adhesive tape in accordance with an embodiment.
Figure 11:
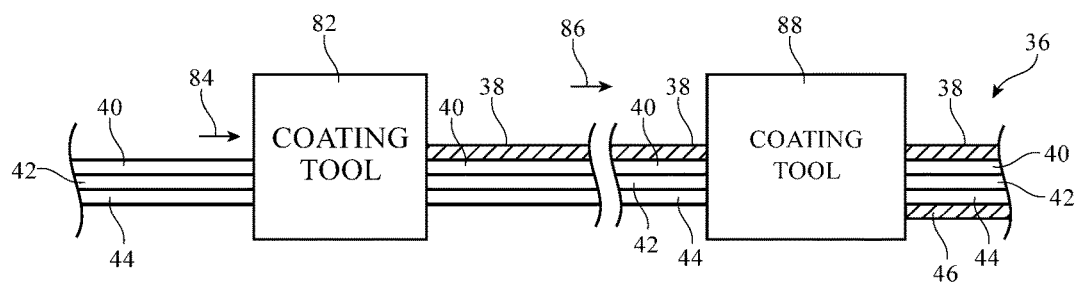
FIG. 11 is a diagram of illustrative equipment for coating opposing upper and lower surfaces of a tape structure of the type shown in FIG. 10 to form adhesive tape in accordance with an embodiment.

Reworkable pressure sensitive adhesive tape 36 may be formed using roll-based processing equipment of the type shown in FIGS. 10 and 11.

FIG. 10 is a cross-sectional side view of equipment that may be used in forming thermoplastic layer 42 between flexible polymer carriers 40 and 44. Roller 64 may dispense a flexible sheet of polymer such as layer 40 by rotating in direction 68 about roller axis 66. Roller 70 may dispense a flexible sheet of polymer such as layer 44 by rotating in direction 74 about roller axis 72. Heated dispensing head 76 may dispense molten thermoplastic adhesive that pools into pool 78 on the surface of layer 46. As layers 42 and 44 are fed in direction 84, melted thermoplastic 78 thins to form layer 80. Layer 80 may be, for example, a solid homogeneous layer that is substantially free from voids (bubbles). As shown in FIG. 10, layer 80 is received between layers 40 and 44 as carriers 40 and 44 are moved in direction 84. Upon cooling below the softening temperature of the thermoplastic adhesive, layer 80 forms a solid flexible thermoplastic layer 42 that attaches layers 40 and 44 to each other.

The coating equipment of FIG. 11 may be used to deposit pressure sensitive adhesive onto the surfaces of layers 40 and 44. As shown in FIG. 11, as layers 40, 42, and 44 of tape 36 are passed through coating tool 82 in direction 84, coating tool 82 deposits pressure sensitive adhesive layer 38 onto carrier 40. As layers 38, 40, 42, and 44 pass through coating tool 88 in direction 86, coating tool 88 deposits pressure sensitive adhesive layer 46 onto carrier 44. Coating equipment such as tools 82 and 88 may process tape layers that have been previously wound onto a roll at the output of the equipment of FIG. 10 (as an example).

Figure 12:
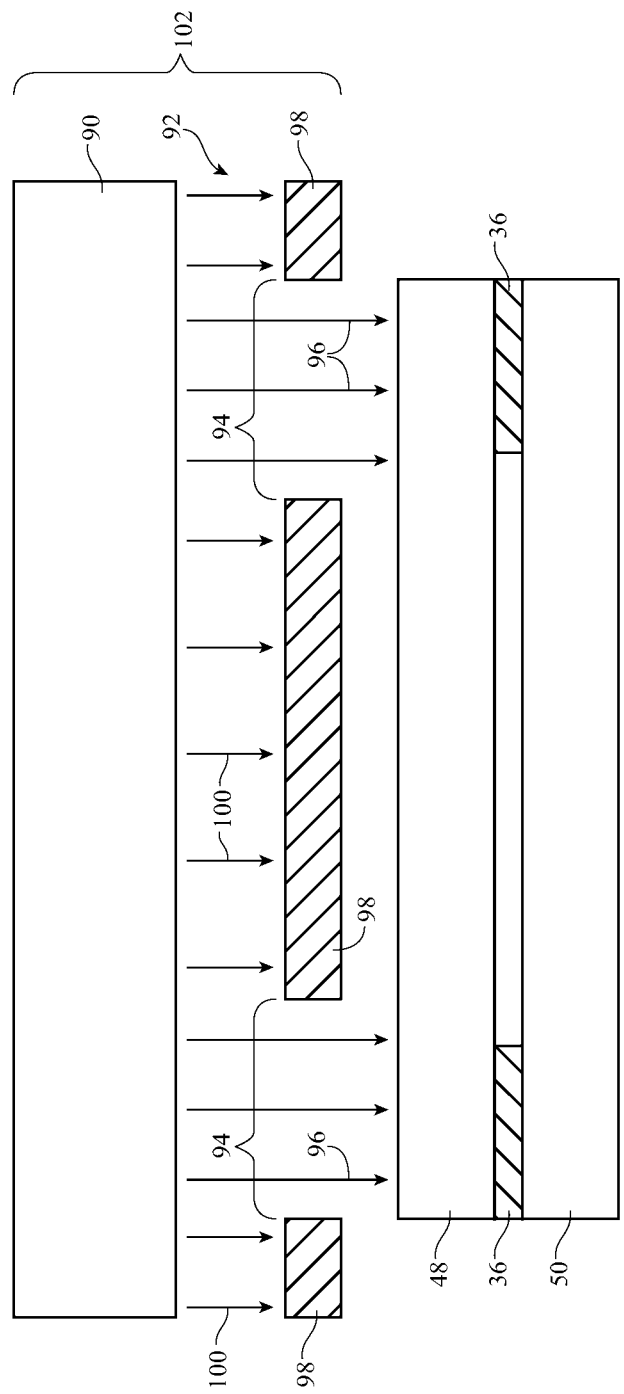
FIG. 12 is a diagram of illustrative heat-based debonding equipment for selectively raising the temperature of different parts of an electronic device assembly to thermally debond adhesive tape in accordance with an embodiment.

FIG. 12 is a diagram of infrared heating equipment of the type that may be used to heat tape 36 during debonding operations. In the example of FIG. 12, structure 48 is attached to structure 50 using a ring of adhesive tape 36 that runs along the periphery of structures 48 and 50. As shown in FIG. 12, infrared heating equipment 102 includes infrared light source 90 and mask 98. Mask 98 may be formed using heat blocking materials such as metal. Mask 98 may have openings such as openings 94. Infrared light source 90 produces infrared light (heat) 92. Infrared light rays such as rays 100 are blocked by the presence of mask 98 and do not reach structures 48 and 50. Because rays 100 are blocked, the central portions of structures 48 and 50 are not unnecessarily heated and exposed to elevated temperatures. Other rays of infrared light 92 such as rays 96 pass through one or more openings 94 in mask 98 and heat tape 36 and adjacent portions of structures 48 and 50. The mask opening shape associated with the openings in mask 98 define the pattern of infrared light 96 reaching tape 36. The patterned infrared light forms a localized heat source that selectively heats only associated portions of structures 48 and 50 that are adjacent to tape 36.

Figure 13:
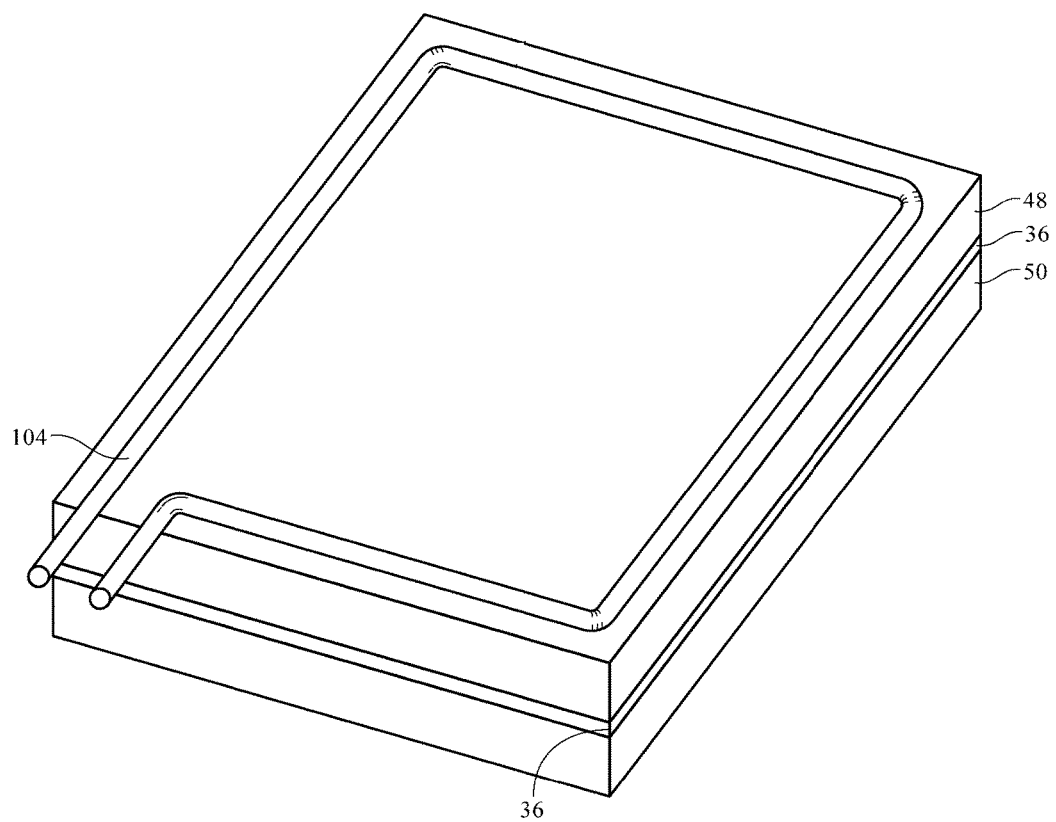
FIG. 13 is a perspective view of an illustrative electronic device having portions that are being selectively heated using an inductive heating apparatus for thermally debonding adhesive tape in accordance with an embodiment.

Another heat source that may be used to selectively apply heat to desired portions of structures 48 and 50 so that tape 36 is heated effectively for debonding operations while minimizing excess heating of structures 48 and 50 that do not overlap tape 36 is shown in FIG. 13. In the example of FIG. 13, structures 48 and 50 are rectangular structures that are coupled using a ring of pressure sensitive adhesive tape 36. Inducting heating equipment such as inductive coil 104 applies localized heat to tape 36 by inductively heating adjacent portions of conductive structures 48 and/or 50. For example, in a configuration in which structure 50 is a metal housing structure in device 10 such as housing 12, coil 104 will create heat in the portions of housing 12 under coil 104. The inductive heating of the structures adjacent to tape 36 such as metal housing 12 raises the temperature of tape 36 when a drive signal is applied to coil 104. Coil 104 may have a shape such as the rectangular shape of FIG. 13 to debond a rectangular ring of adhesive tape 36 or may have other suitable shapes for locally heating selected portions of structures 48 and 50 and tape 36.

During application of heat, temperature gradients may be formed through structures 48 and 50 and tape 36. These temperature gradients can be characterized based on known factors such as the materials used to form structures 48 and 50, the shapes of structures 48 and 50, and the amount of time for which the heat is applied. If desired, temperature measurements may be made to determine the temperature to which each portion of the heated structures will rise to when localized heat is applied for a given amount of time.

Figure 14:
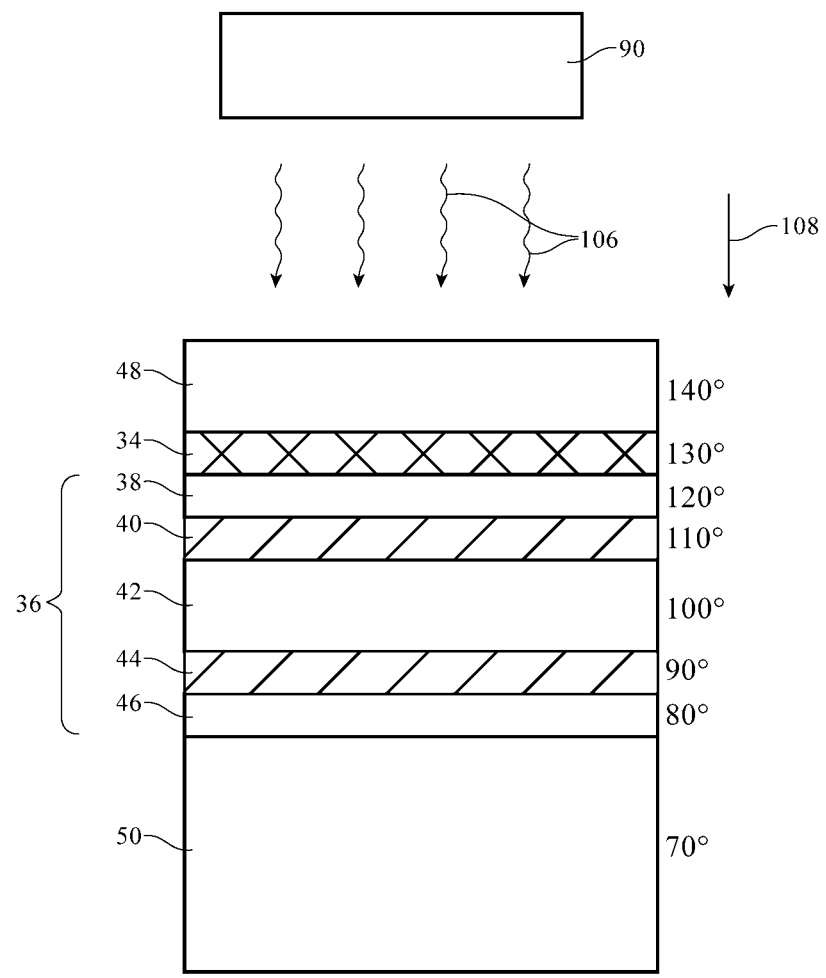
FIG. 14 is a cross-sectional side view of structures in an electronic device that have been attached to each other using adhesive tape during a thermal debonding process showing how thermal gradients may arise across the adhesive tape in accordance with an embodiment.

The characterized temperature gradient behavior of the structures that are being heated can then be exploited during debonding operations to ensure that structures in device 10 are not heated excessively as thermoplastic 42 is being softened in tape 36. Consider, as an example, the heating scenario of FIG. 14. In the example of FIG. 14, structures 48 and 50 have been attached using adhesive tape 36. When it is desired to debond tape 36, heat 106 (e.g., infrared light) is applied to structures 48 and 50 and tape 36 in direction 108 by infrared light source 90. Structure 48 is closest to heat source 90, so structure 48 is elevated to a temperature of 140° C. (in this example). Structure 48 may be, for example, a display cover glass layer or other device structure in device 10. Layer 34 may be an opaque masking layer such as a layer of opaque ink (as an example). Because layer 34 is farther from source 90 than structure 48, layer 34 is heated to a lower temperature such as 130° C. The layers of tape 36 are heated to temperatures that drop as a function of distance from light source 90. For example, pressure sensitive adhesive layer 38 may be heated to a temperature of 120° C., carrier layer 40 may be heated to a temperature of 110° C., thermoplastic layer 42 may be heated to a temperature of 100° C., carrier 44 may be heated to a temperature of 90° C., and pressure sensitive adhesive 46 may be heated to a temperature of 80° C. Underlying structure 50 may be heated to a temperature of 70° C.

The temperature gradient in FIG. 14 may help ensure that thermoplastic layer 42 is heated above its softening temperature while other structures are maintained at safe temperatures. For example, layer 42 may be softened to debond tape 36 by raising layer 42 to 100° C. Structure 50 may be an anodized aluminum housing structure (as an example) that has an anodized coating that is not damaged when maintained at a temperature below 80° C. (as in the FIG. 14 example). Structure 48 may be a glass layer that can withstand elevated temperatures (e.g., temperatures of 180° C. or higher). Because structure 48 is heated to 140° C. in the FIG. 14 example, structure 48 will not be damaged. Layer 34 may be an ink layer that is able to withstand damage if heated to less than 140° C. (e.g., to 130° C. in the FIG. 14 example). Flexible polymer layers 40 and 44 and pressure sensitive adhesive layers 38 and 46 may withstand damage when heated to less than 130° C. (as in the FIG. 14 example). If there were no temperature gradient in this example, heating layer 42 to 100° C. would result in heating structure 50 to 100° C., which could damage structure 50.

Figure 15:
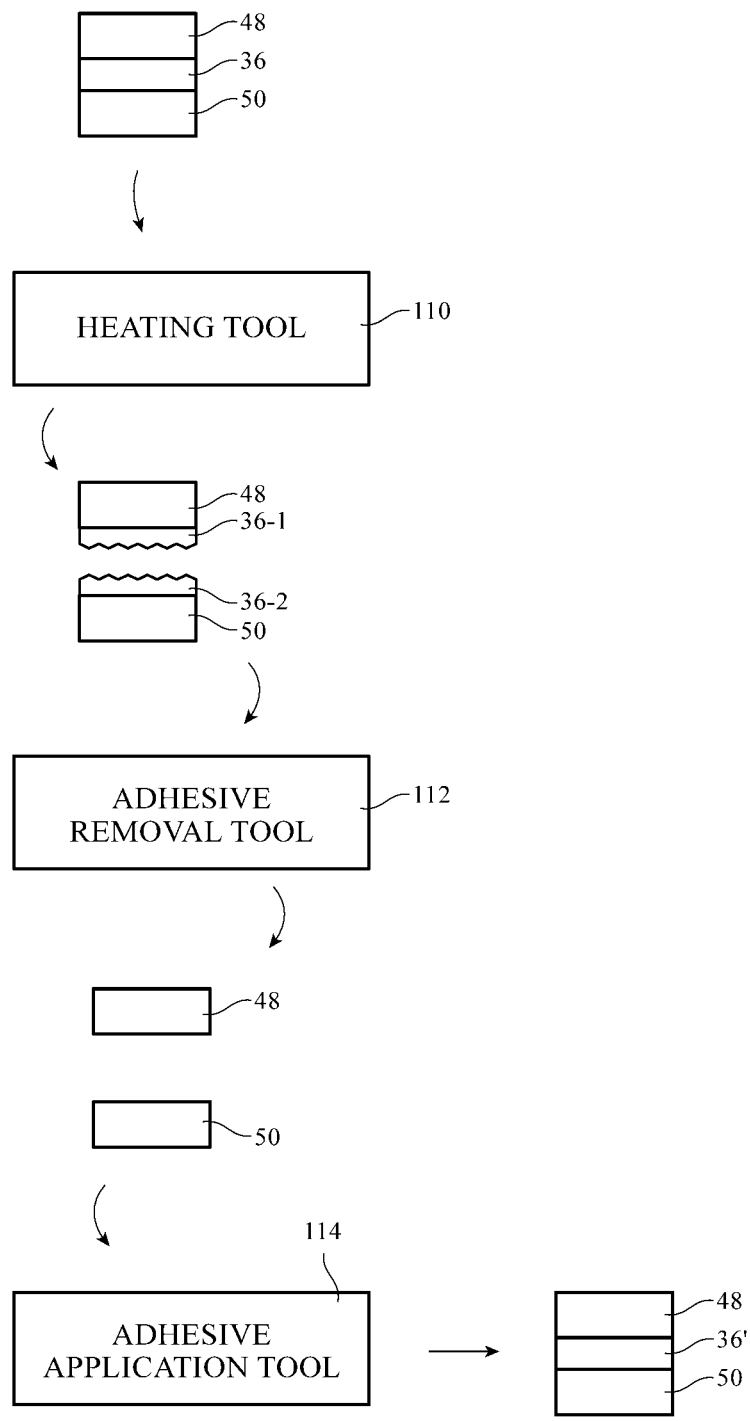
FIG. 15 is a diagram showing how electronic device structures may be attached to each other using adhesive tape and showing how the structures may be reworked in accordance with an embodiment.

FIG. 15 shows illustrative equipment and operations of the type that may be involved in reworking an adhesive bond formed using tape 36.

As shown in FIG. 15, pressure may be applied to structures 48 and 50 while reworkable pressure sensitive adhesive tape 36 is interposed between structures 48 and 50, thereby bonding structures 48 and 50 together with tape 36.

Heating tool 110 may produce heat for selectively heating desired portions of device structures 48 and 50 and tape 36. Heating tool 110 may be a hot plate, a heated chamber, an infrared heat source, an inductive heater, a laser, a lamp, a hot bar, or other heating equipment for locally heating structures 48 and 50 and tape 36. Once thermoplastic adhesive layer 42 in tape 36 has been heated above the softening point of thermoplastic layer 42, parts 48 and 50 may be separated from each other. During the softening of thermoplastic layer 42, pressure sensitive adhesive layers may be heated and my temporarily lose some of their cohesive strength.

Following debonding operations and cooling of pressure sensitive adhesive in tape remnants 36-1 and 36-2, adhesive removal tool 112 (e.g., a computer-controlled tape peeling machine and/or manually operated equipment) may be used to peel off tape remnants 36-1 and 36-2 from structures 48 and 50. The cohesive strength of pressure sensitive adhesive 38 and 46 is restored by cooling the tape, so the tape can be cleanly peeled away from structures 48 and 50 without using solvent.

Adhesive application tool 114 (e.g., computer-controlled equipment and/or manually controlled equipment) may be used to apply a fresh layer of adhesive tape 36' to join structures 48 and 50 after replacing or repairing structures 48 and/or 50 or other associated device structures. The operations of FIG. 15 may be performed during manufacturing or in the field (e.g., at a service center).

Figure 16:
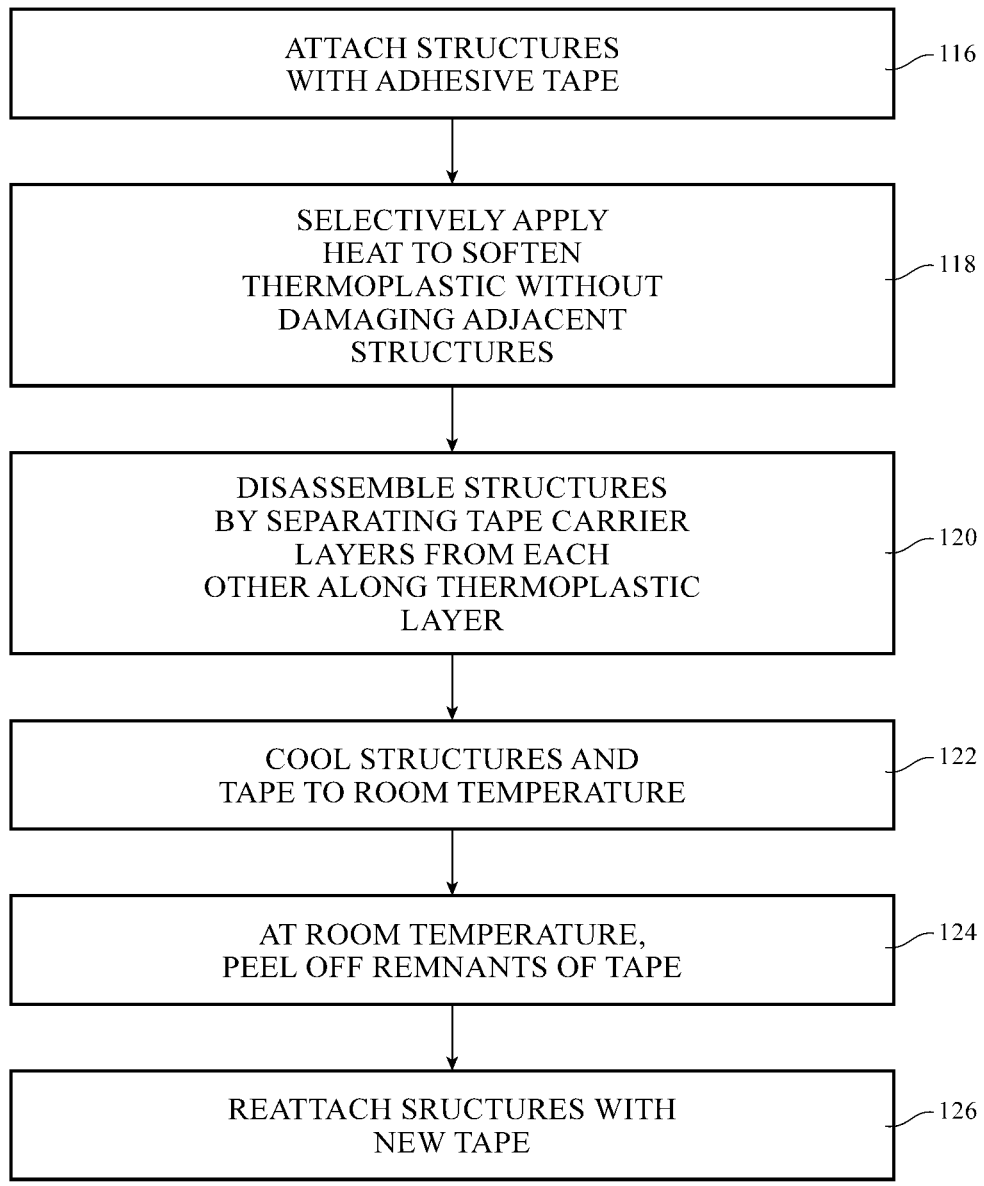
FIG. 16 is a flow chart of illustrative steps involved in attaching electronic structures together using adhesive tape and in reworking the attached electronic device structures by removing the adhesive tape and applying new adhesive tape in accordance with an embodiment.

FIG. 16 shows illustrative steps involved in using tape 36 to assemble and rework structures for electronic devices.

At step 116, electronic device structures such as structures 48 and 50 may be bonded using reworkable pressure sensitive adhesive tape 36. For example, pressure may be applied to structures 48 and 50 at room temperature so that a layer of tape 36 is compressed between the opposing surfaces of structures 48 and 50.

During testing or use of device 10 in the field, it may be determined that part of device 10 should be repaired. To facilitate rework, debonding operations may be performed on the joint formed from tape 36. In particular, heating equipment may selectively apply heat to tape 36 during the operations of step 118. Heat may be applied using an infrared heat source, an inductive heater, a laser, a hot bar or hot plate or other equipment that heats objects through direct contact, or other heating equipment. Heat may be applied in localized area and/or may be applied in a way that gives rise to a thermal gradient through structures 48 and 50 and tape 36. This allows sufficient heat to be applied to thermoplastic adhesive layer 42 of tape 36 without damaging structures 48 and 50 or other structures in device 10.

During the operations of step 118, thermoplastic adhesive layer 42 is preferably heated above its softening temperature, so that layer 42 is liquefied and/or otherwise is weakened sufficiently to allow structures 48 and 50 to be separated at step 120 without disrupting the pressure sensitive adhesive layers and carrier layers in tape 36. The disassembly operations of step 120 involve pulling apart structures 48 and 50 along the weakened interface created by softened thermoplastic 42.

At step 122, structures 48 and 50 and the remnants of tape 36 that remain stuck to structures 48 and 50 may be cooled to room temperature or a lowered temperature. This helps ensure that the cohesive strength of the pressure sensitive adhesive in the tape remnants will be restored to its original level or higher.

At step 124, tabs or other structures protruding from the carriers in the tape remnants may be pulled to peel the tape remnants cleanly off of structures 48 and 50.

Once structures 48 and 50 have been separated and tape 36 has been removed, repairs may be made by replacing faulty parts with replacement parts that are defect-free or may be made by correcting problems with a faulty part or by correcting problems with the way in which a part has been incorporated into device 10.

Following these rework operations, structures 48 and 50 may be reattached to each other using fresh tape 36 (step 126).

The foregoing is merely illustrative and various modifications can be made by those skilled in the art without departing from the scope and spirit of the described embodiments. The foregoing embodiments may be implemented individually or in any combination.

What is claimed is:

1. Reworkable adhesive tape, comprising:
a first carrier comprising a first flexible polymer layer;
a second carrier comprising a second flexible polymer layer;
a thermoplastic adhesive that attaches the first carrier to the second carrier, wherein the thermoplastic adhesive has a softening temperature of 50-120° C., and wherein the first and second flexible polymer layers are formed from a polymer that does not soften at temperatures below the softening temperature of the thermoplastic adhesive;
a first layer of adhesive on the first carrier; and
a second layer of adhesive on the second carrier.

2. The reworkable adhesive tape defined in claim 1 wherein the first and second layers of adhesive are pressure sensitive adhesive layers.

3. The reworkable adhesive tape defined in claim 2 further comprising first and second release liners coupled to the first and second pressure sensitive adhesive layers.

4. The reworkable adhesive tape defined in claim 1 wherein the first carrier has a protruding tab.

5. The reworkable adhesive tape defined in claim 1 wherein the first and second flexible polymer layers are polyester films.

6. The reworkable adhesive tape defined in claim 1 wherein the thermoplastic adhesive comprises polycarbonate.

7. The reworkable adhesive tape defined in claim 6 wherein the thermoplastic adhesive is elastomeric.

8. The reworkable adhesive tape defined in claim 1 wherein the first and second carriers, the thermoplastic adhesive, and the first and second layers of adhesive exhibit a temperature gradient when heated.

9. A method, comprising:
attaching first and second electronic device structures together using double-sided reworkable pressure sensitive adhesive tape having first and second flexible polymer carrier films each having a thickness of 2-50 microns, having a thermoplastic adhesive that attaches the first and second flexible polymer carrier films together, having a first pressure sensitive adhesive layer on the first flexible polymer carrier film, and having a second pressure sensitive adhesive layer on the second flexible polymer carrier film;
heating the reworkable pressure sensitive adhesive tape to soften the thermoplastic adhesive; and
separating the first and second electronic device structures by pulling apart the tape while the thermoplastic adhesive is softened so that the reworkable pressure sensitive adhesive tape divides along the thermoplastic adhesive into first and second reworkable pressure sensitive adhesive tape remnants.

10. The method defined in claim 9 wherein attaching the first and second electronic device structures together comprises pressing together the first and second electronic device structures.

11. The method defined in claim 10 wherein heating the reworkable pressure sensitive adhesive tape comprises applying localized heat to the reworkable pressure sensitive adhesive tape using equipment selected from the group consisting of: infrared heating equipment and inductive heating equipment.

12. The method defined in claim 11 wherein the first electronic device structure is a display cover layer, wherein the second electronic device structure is an electronic device housing, and wherein heating the reworkable pressure sensitive adhesive tape comprises creating a temperature gradient so that the display cover layer is hotter than the electronic device housing while the thermoplastic adhesive is being softened.

13. The method defined in claim 9 further comprising:
cooling at least the first reworkable pressure sensitive adhesive tape remnant to restore cohesive strength to the first pressure sensitive adhesive layer after heating the reworkable pressure sensitive adhesive tape.

14. The method defined in claim 13 further comprising cleanly peeling at least the first reworkable pressure sensitive adhesive tape remnant from the first electronic device structure after cooling the first reworkable pressure sensitive adhesive tape remnant.

15. The method defined in claim 14 further comprising reattaching the first and second electronic device structures together with additional reworkable pressure sensitive adhesive tape.

16. Apparatus, comprising:
reworkable pressure sensitive adhesive tape having first and second flexible polymer carrier films each having a thickness of 2-50 microns, a thermoplastic adhesive that attaches the first flexible polymer carrier film to the second flexible polymer carrier film, a first pressure sensitive adhesive layer on the first flexible polymer carrier film, and a second pressure sensitive adhesive layer on the second flexible polymer carrier film, wherein the thermoplastic adhesive has a softening temperature and wherein the first and second polymer carrier films are formed from a polymer that does not soften at temperatures below the softening temperature of the thermoplastic adhesive;
a first electronic device structure; and
a second electronic device structure that is attached to the first electronic device structure by the reworkable pressure sensitive adhesive tape.

17. The apparatus defined in claim 16 wherein the first electronic device structure comprises a display cover layer.

18. The apparatus defined in claim 16 wherein the second electronic device structure comprises an electronic device housing.

19. The apparatus defined in claim 16 wherein at least the first flexible polymer carrier film has a tab that protrudes from between the first and second electronic device structures.

20. The apparatus defined in claim 16 wherein the softening temperature is 80-100° C.

* * * * *